United States Patent Office 3,120,504
Patented Feb. 4, 1964

3,120,504
ART OF PRODUCING ACRYLONITRILE POLYMERS
Peter A. Jarovitzky, New Rochelle, and Marvin Wishman, White Plains, N.Y., assignors to American Cyanamid Company, New York, N.Y., a corporation of Maine
Filed Nov. 20, 1959, Ser. No. 854,447
9 Claims. (Cl. 260—80.5)

This invention relates broadly to the art of producing acrylonitrile polymers. It is especially concerned with certain new and useful improvements in the production of filament-forming (filament-formable) polymers of acrylonitrile that also contain a vinyl-substituted heterocyclic tertiary amine, more particularly a vinylpyridine, combined in the polymer molecule.

Homopolymers of acrylonitrile and copolymers of acrylonitrile with other polymerizable organic compounds containing at least one ethylenic bond are, of course, known. These polymers have achieved wide use in the production of many valuable commercial products, e.g., synthetic rubber and, more recently, synthetic fibers.

Recent developments in the polymerization of acrylonitrile have been concerned largely with polymerization in aqueous media, for instance as described in Jacobson U.S. Patent No. 2,436,926, March 2, 1948, Brubaker and Jacobson U.S. Patent No. 2,462,354, February 22, 1949, and Rothrock U.S. Patent No. 2,640,049, May 26, 1953; and with the use of redox-catalyst systems that aim to give a high yield of polymer in a short time at a moderate temperature. Redox-catalyst systems comprising a peroxy compound and a sulfoxy compound such as, for example, ammonium persulfate and sodium bisulfite, have been used for the polymerization and copolymerization of acrylonitrile (see, for example, the aforementioned U.S. patents), as also have redox systems comprising a water-soluble chlorate, e.g., sodium or potassium chlorate, and a water-soluble sulfite, bisulfite or hydrosulfite, e.g., sodium sulfite, bisulfite or hydrosulfite (see, for instance, British Patent No. 706,138 and Cresswell U.S. Patent No. 2,751,374, dated June 19, 1956).

Processes such as described in the aforesaid patents and in others have been mentioned as being applicable to the production of homopolymeric acrylonitrile and copolymers thereof with many other monoethylenically unsaturated materials which are copolymerizable with acrylonitrile, e.g., methyl acrylate, vinyl acetate, acrylamide, acrylic acid, methacrylonitrile, etc.

To improve the dye-receptivity of the filamentary polyacrylonitrile, it has been suggested in many patents that a basic monomer be copolymerized with the acrylonitrile to impart better dye-receptivity (especially toward acid dyes) to the end-product. The various vinyl-pyridines have been extensively used or proposed for this purpose (see, for example, Arnold U.S. Patent No. 2,491,471, dated December 20, 1949; Chaney and Hoxie U.S. Patent No. 2,687,938, dated August 31, 1954; Canadian Patent No. 522,812, dated March 20, 1956; and Canadian Patent No. 524,179, dated April 24, 1956). The problems encountered in forming spinnable or fiber-forming copolymers of acrylonitrile and a vinylpyridine that are uniform from the standpoint of molecular weight distribution and structure, and in other characteristics, are pointed out in the above-named Rothrock Patent No. 2,640,049. As the polymerization of acrylonitrile alone and with other copolymerizable monomers is commonly carried out under acidic conditions (generally in the presence of an inorganic acid) when a redox-catalyst system is used, the acrylonitrile-vinylpyridine copolymer is obtained in the form of an addition salt thereof with the acid used in the polymerization process, e.g., nitric, hydrochloric, sulfuric, etc.

Polymers of acrylonitrile containing no basic modifying component can be readily washed, with water alone, substantially free of anions such as nitrate, chloride, sulfate, etc., but this is not true when the acrylonitrile polymer conains a basic group.

When filaments or fibers are dry-spun from organic-solvent solutions of an acrylonitrile polymer that also contains a vinylpyridine combined in the polymer molecule, no particular problems are generaly encountered even though it be in the form of an addition salt of the polymer with the acid used in the polymerization process, examples of which have been given above. However, when organic solvent solutions of an acrylonitrile-vinylpyridine copolymer containing bound anions are wet-spun into certain aqueous coagulating baths, e.g., an aqueous solution containing from about 3% to about 25% by weight of a water-soluble thiocyanate (specifically sodium thiocyanate), difficulties frequently arise due to the fact that the polymer (if not initially in the form of the thiocyanic acid salt) is converted into a thiocyanic acid salt when the polymer solution is extruded through the openings in a spinnerette to form a gelled filamentary material upon coming into contact with the said aqueous coagulating bath. Such difficulties commonly take the form of obtaining "off-shade" colors when efforts are made to dye the finished fiber or fabric with certain dyes, e.g., premetallized acid dyes. Also, the wet fiber may absorb appreciable amounts of iron (e.g., from corrosion of equipment), which then may make itself evident as red streaks of iron thiocyanate in the wet fiber (or as a pink or yellowish pink shade in the fiber after its initial drying) when a large amount of thiocyanic acid is bound with the polymer in the form of an addition salt. These same difficulties are encountered when the acrylonitrile-vinylpyridine copolymers are dissolved in certain aqueous solutions, e.g., a concentrated aqueous solution of a water-soluble thiocyanate, and for the same reasons.

The invention disclosed and claimed in the copending application of Arthur Cresswell, Serial No. 605,446, filed August 21, 1956, now Patent No. 2,916,348, dated December 8, 1959, and assigned to the same assignee as the present invention, is based on Cresswell's discovery that, in producing filaments from a filament-forming, inorganic acid salt of an acrylonitrile polymer that also contains a vinylpyridine combined in the polymer molecule, the foregoing difficulties are obviated and improved results are obtained by wet-spinning, into an aqueous coagulating bath, a solution of the said salt of the said polymer to form a gelled filamentary material. Subsequently, this gelled filamentary material is contacted with an aqueous ammoniacal solution (preferably a solution of ammonia) having a pH ranging between about 8 and about 11, preferably a pH of about 10. By this treatment the gelled filamentary material is rendered substantially free of bound anions.

It may here be pointed out that there are further difficulties which may arises if salt-form polymer is used in, for example, an inorganic salt solution in making a fiber. Use of salt-form polymer results in "dope" (spinning) solutions of pH less than 7.0 so that part or all of the pyridine in the polymer molecule is present as the pyridinium cation in solution. When the polymer solution is extruded through the openings in a spinnerette to form a gelled filamentary material upon coming in contact with an aqueous salt solution, e.g., aqueous sodium thiocyanate, as a coagulating bath, the gelled material contains pyridinium cations and also carries thiocyanate anions to balance the charge, thereby resulting in the above-mentioned difficulties caused by thiocyanate contamination. Such difficulties may be avoided by use of an ammonia-washed polymer which will result in a dope solution of pH 7.0–7.5. The foregoing difficulties may also be avoided by using a solvent adjusted to a high pH so that the resulting dope solution with salt-form polymer will be 7.0–7.5. However, use of high solvent pH leads to solvent degradation. The difficulties with bound thiocyanate may additionally be avoided by adjusting the dope solution pH after the polymer and solvent are mixed. However, none of these methods except for ammonia washing of polymer results both in gelled filamentary material substantially free of bound anions as well as a solvent system substantially free of all ions except for cation, e.g., sodium, and anion, e.g., thiocyanate, originally present in the inorganic salt solution employed as solvent.

It was suggested prior to our invention that, in producing a filament-forming polymer of acrylonitrile that also contains a vinylpyridine combined in the polymer molecule, the aforementioned difficulties in producing and in dyeing filaments made from the acrylonitrile polymer are obviated or minimized, and improved results could be obtained, by contacting (as by mixing, e.g., in slurry from) an inorganic acid salt form of the said polymer with an alkaline liquid treating agent comprising an aqueous ammoniacal solution having a pH ranging between about 8.5 and about 10.5, e.g., from 9 to 10, in order to reduce substantially the amount of inorganic acid that is present as a salt in the said polymer. The organic acid which is combined in the polymer in salt form is that employed in the polymerization process, and is usually a strong mineral acid such, for instance, as nitric, sulfuric, phosphoric, hydrochloric, etc.

The present invention is an improvement upon the technique described in the preceding paragraph, and provides new, useful and unobvious results. It is based upon our discovery that, in the production of a filament-forming polymer comprised of, by weight, a major amount (more than 50%) of acrylonitrile and a minor amount (less than 50%), of a vinylpyridine combined in the polymer molecule, one can reduce substantially the amount of inorganic acid that is present as a salt in the said polymer (as well as secure other unexpected advantages described hereinafter) by contacting at 40° C. to 80° C. an undissolved or solid, inorganic salt form of the said polymer with a liquid (more particularly an aqueous liquid) treating agent which is maintained at a pH ranging between 5.0 and 7.5, preferably between about 6.0 and about 7.0, by the addition of an aqueous ammonia solution.

A preliminary washing of the polymer with water at a temperature between, for example, 10° C. and 80° C., is usually done, thereby to remove from the polymer the free acid and some polymer combined in salt form. After the ammonia treatment of the polymer it is optional whether or not this treatment be followed by washing with an approximately neutral fluid comprising water, e.g., water alone. If at the end of the ammonia treatment the pH of the polymer is approximately neutral (e.g., a pH not exceeding about 7.5), further washing may not be necessary. However, if a final wash is to be applied in order to remove any traces of adsorbed ammonia that may be present and/or any ammonium salt resulting from treatment of the polymer with the aqueous ammonia solution, there may be used, for instance, deionized water having a pH as low as, for example, 6.0. Other aqueous fluids comprising water that are approximately neutral (for instance, a pH between 6.0 and about 7.3 or 7.4) can be employed.

By practicing our invention we have found that nitrate and/or other anions can be removed more rapidly and more completely from an inorganic acid salt form of a copolymer of acrylonitrile and a vinylpyridine than could be accomplished by the prior methods, while at the same time reducing the amount of polymer degradation as evidenced by better polymer color. As a result, fibers of improved color can be prepared and the rate of contamination of process streams is greatly reduced.

Another unexpected advantage flowing from our invention is that it requires the use of only about 15 to 20% as much ammonia as compared with processes involving the use of pH conditions of, say, 8 to 11 and a temperature of 20°–30° C. (room temperature) in contacting the aforementioned kind of copolymer with an aqueous ammonia solution.

Our invention provides an acrylonitrile-vinylpyridine copolymer which is nearly neutral and contains no large amount of $NH_3$ adsorbed upon its surface. By prior practices involving the use of higher pH conditions (e.g., 8 to 11) and room-temperature treating conditions, the resulting acrylonitrile copolymer was contaminated with free $NH_3$ adsorbed upon its surface and which was difficult to remove therefrom. By practicing the instant invention the copolymer is substantially free of anions and, also, of the chemical (ammonia) used to aid in their removal. This is a matter of considerable practical importance since the ammonia is strongly adsorbed and can otherwise be removed only by washing the polymer with a large excess of water. Such extensive washing obviously adds materially to the time and cost of carrying out the process.

By practicing the method of the present invention, as described briefly above and more fully hereinafter, a simple and inexpensive means is provided for removing bound anions, such as nitrate, sulfate, chloride, etc., from the polymer and which, if not removed substantially completely, will be converted into an objectionable salt form (e.g., thiocyanate) when the polymer is made into filaments by certain processes hereinbefore described. The treatment also removes any other impurities that are soluble in an aqueous ammonia solution and which may affect, or tend to affect, the color, heat stability or dye-receptivity of the finished fiber or filament. Furthermore, wet filaments made from the ammonia-treated polymers do not stain with iron in the form of, for example, ferric thiocyanate. An important advantage of our invention over that disclosed and claimed in the aforementioned Cresswell copending application is that, by treating the polymer in accordance with our invention rather than treating the gelled filaments as is done by Cresswell, the rate of contamination of the process streams (employed in making filaments from the polymer) is materially reduced and, in fact, is almost completely obviated when the ammonia treatment of the polymer is such that it has been converted substantially completely to free-base form, e.g., to a content of bound anion, specifically the nitrate, of 0.2% or less (calculated as sodium nitrate) based on the weight of the polymer. When an inorganic solvent is used, solvent purification is normally accomplished by reconcentration of the solvent. Since the anions introduced into the solvent system along with the polymer are frequently more soluble than the thiocyanate anion, reconcentration of thiocyanate is made more difficult, and, in fact, may become impossible due to precipitation of sodium thiocyanate at concentrations less than that required for solution of polymer.

The above and other advantageous results flowing from the invention are obtained without adversely affecting the other useful properties of filaments made from the ammonia-treated acrylonitrile-vinylpyridine copolymer (e.g., tenacity, elongation, water resistance, abrasion resistance, etc.), and in no way could have been predicted, especially in view of the well-known fact that polyacrylonitrile filaments, as normally produced, are attacked by certain other alkaline solutions upon prolonged immersion therein, e.g., for 1 day in a 10% aqueous sodium hydroxide solution at 50° C.

The preferred filament-forming acrylonitrile copolymers (in the form of an inorganic acid salt thereof, preferably the nitric acid salt thereof) that are treated in accordance with the present invention are those containing, by weight, a major amount of acrylonitrile and a minor amount of a vinylpyridine combined in the polymer molecule, and especially those containing, by weight, at least 80% acrylonitrile and at least 2% of a vinylpyridine (preferably a methyl vinylpyridine including 2-methyl-5-vinylpyridine). A preferred sub-class within this broader class is that comprised of filament-forming copolymers (in the form of, for example, a nitric acid salt thereof) of, by weight, from 80% to 96% acrylonitrile, from 2% to 10% of a vinylpyridine (and which preferably includes 2-methyl-5-vinylpyridine) and from 2% to 10% of a third different monoethylenically unsaturated material, e.g., vinyl esters including the formate, acetate, propionate, the various acrylic esters including the lower alkyl acrylates and methacrylates such as the methyl, ethyl and propyl acrylates and methacrylates; the various acrylamides including acrylamide itself and methacrylamide; the various acrylic acids including acrylic acid itself and methacrylic acid; methacrylonitrile and other copolymerizable substituted acrylonitriles; unsaturated alcohols including allyl alcohol; vinyl-substituted aromatic hydrocarbons, e.g., styrene, the various ring-substituted methylstyrenes, isopropenyl toluene; and others including those given by way of example in, for instance, Cresswell U.S. Patent No. 2,558,730, dated July 3, 1951 (column 3, lines 31–55), and Price U.S. Patent No. 2,736,722, dated February 28, 1956 (column 4, line 66 through line 27 in column 5). The "third different monoethylenically unsaturated material" mentioned above includes within its meaning a plurality of such materials.

Vinylpyridines which can be employed in making copolymers with acrylontrile, and treated as herein described, are vinylpyridines represented by the formula

I and which include 2-vinylpyridine, 3-vinylpyridine and 4-vinylpyridine; methyl vinylpyridines represented by the formula

II and which include 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine and 3-methyl-4-vinylpyridine. The vinylpyridines embraced by Formula II are a preferred sub-group within a broader class of vinylpyridines that are advantageously employed in making copolymers which are treated in accordance with the present invention and which may be represented by the formula

III and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula

IV wherein R represents a lower alkyl radical, examples of which have been given hereinbefore, and $n$ represents an integer from 1 to 5, inclusive.

One can substitute in the copolymers mentioned in the specific examples hereinafter given an equivalent amount of any of the vinylpyridines, of which numerous examples have just been given, for the specific vinylpyridine named in the individual example, and then make spinning solutions from which filamentary polyacrylonitrile is produced.

The filament-forming inorganic acid salt of the acrylonitrile polymer that also contains a vinylpyridine combined in the polymer molecule is prepared by known methods, e.g., as described in Rothrock U.S. Patent No. 2,640,049, dated May 26, 1953, or by the methods disclosed in Price and Thomas Canadian Patent No. 577,442 and in Thomas and Guth Canadian Patent No. 577,451, each dated June 9, 1959.

Ordinarily, the molecular weight (average molecular weight) of the acrylonitrile-vinylpyridine copolymer is within the range of from about 30,000 to about 200,000, more particularly from about 40,000 to about 100,000, and still more particularly from about 60,000 to about 80,000, as calculated from a viscosity measurement of the said copolymer in dimethyl formamide using the Staudinger equation (reference: Houtz U.S. Patent No. 2,404,713, dated July 23, 1946). Acrylonitrile-vinylpyridine copolymers which yield a solution having a specific viscosity of 40° C. within the range of 2 to 10 when 1 gram of the copolymer is dissolved in 100 ml. of 60% aqueous sodium thiocyanate have an average molecular weight which enables the copolymer to be used as a filament-forming material and such copolymers (in the form of their nitric or other inorganic acid salts) can, therefore, be treated in accordance with the present invention.

Although not limited thereto, the spinning solutions which are made from acrylonitrile-vinylpyridine copolymers that have been treated by the method of our invention are preferably those produced by dissolving the copolymer in a solvent comprising a concentrated aqueous solution of a water-soluble salt which yields highly hydrated ions in an aqueous solution. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. The preferred salt is an alkali-metal thiocyanate, specifically sodium thiocyanate. Other examples of suitable solvents are concentrated aqueous solutions of guanidine thiocyanate, the mono-(lower alkyl)-substituted guanidine thiocyanates, and the symmetrical and unsymmetrical di-(lower alkyl)-substituted guanidine thiocyanates.

Figure 1:
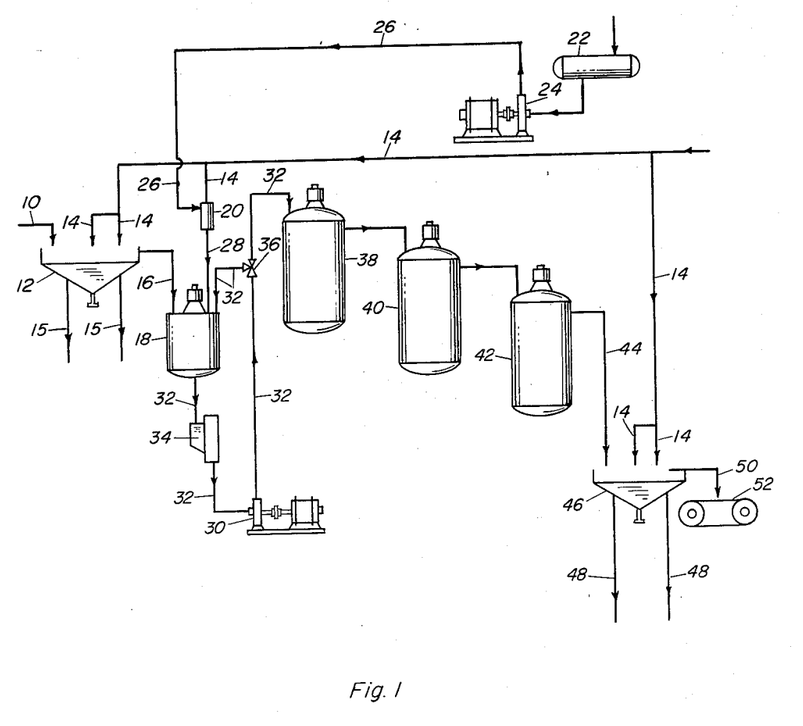

Various kinds of apparatus and modifications of the inventive concept can be employed in practicing the present invention. FIGURE I of the accompanying drawing illustrates schematically one suitable procedure and apparatus that can be used.

With reference to the drawing, a slurry of water and an acrylonitrile-vinylpyridine of the kind with which this invention is concerned is charged through the line 10 to a suitable washing device 12 such as, for instance, a rotary vacuum filter. The aqueous slurry is of pumpable consistency and contains, for example, from about 15% to about 35% by weight of polymer solids. Prior to discharge to the washing device the unreacted volatile monomers have been removed from the polymerization mass containing the copolymer by suitable means. The polymer is washed on the filter with water, e.g., at a temperature of about 10° C. to about 80° C., preferably at about 45°–75° C., specifically at about 60° C., in order to provide maximum efficiency of this purification step. The wash water is carried through the line 14, and washing serves to remove free or uncombined inorganic and pyridinium salts, free acids, residues of catalyst and other water-soluble contaminants. When this step is carried out under optimum conditions, it will result in the removal from the polymer of all uncombined anions, specifically $NO_3^-$, as well as of low-molecular-weight fractions of polymer containing relatively large proportions of combined vinylpyridine. The washings are indicated by the lines 15.

The washed polymer is discharged from the washing device 12 as a polymer crumb containing, for instance, about 55% to 65% by weight of water and a certain amount (depending upon the polymer composition) of inorganic acid which is bound, as a salt, with the polymer. The moist crumb falls, as indicated by the line 16, into a re-pulper 18 where an aqueous solution of ammonium hydroxide is added at the rate (adjusting when necessary) required to form and maintain a slurry having a pH within the range hereinbefore described, and specifically a pH ranging between 5.0 and 7.5. The polymer solids content of the slurry formed in the re-pulper may be as low as, for example, 10% or 15% by weight thereof; while the upper percentage is limited only by its pumpability, some slurries being pumpable when they contain as much as, for example, about 35% by weight thereof of acrylonitrile-vinylpyridine polymer. All percentages mentioned are on a net-dry basis unless otherwise stated. Concentrations of polymer in the slurry below 10% by weight thereof are operative, but serve no useful purpose over the higher concentrations and add to the volume of slurry to be handled. Good results have been obtained when the concentration of polymer solids in the slurry is between 20% and 21% by weight thereof.

In the operation of the re-pulper 18 water is conducted through the line 14 to the mixer 20. To this mixer also is pumped an aqueous solution of ammonium hydroxide (e.g., in the form of a 2% aqueous solution) from the tank 22. This ammonium hydroxide solution is pumped by means of the pump 24 through the line 26 to the mixer 20. The amounts of water and aqueous ammonium hydroxide are proportioned in the mixer 20 so that the slurry will have the desired pH within the range of 5.0 to 7.5. From the mixer 20 the diluted aqueous ammonium hydroxide solution flows through the line 28 to the re-pulper 18, which is provided with a suitable agitator.

In starting up the unit, the agitator in the repulper is started and also the pump 30. The contents of the re-pulper are then continuously recirculated through the line 32 (if necessary or desirable also through the mill 34) and back to the re-pulper 18, the valve 36 being turned so that such recirculation can be effected.

When the re-pulper is nearly full, a portion of its contents, e.g., one-half, is transferred to the residence tank 38 by appropriately turning the valve 36; or other valve or valves that may be employed to accomplish the same result. The tanks 38, 40 and 42 are each provided with agitators and with suitable heating means, e.g., coils or jackets through which hot water, steam, or other heating fluid can be passed to heat the contents to the desired temperature. Suitable temperature-control means are also provided. The ammoniated slurry is allowed to accumulate first in tank 38, from which it overflows, as indicated, into tank 40, and from the latter into tank 42. The rate of discharge of the slurry from tank 42 is adjusted so that the residence time of the ammoniated slurry in the residence tanks is of suitable duration, e.g., from ½ to about 7 or 8 hours. Good results have been obtained by providing a total residence time of from 2½ to 3 hours.

From the tank 42 the ammoniated slurry passes through the line 44 to a suitable filter unit 46, which preferably is so designed as to permit washing of the polymer on the filter. An example of suitable apparatus for this purpose is a rotary vacuum filter. If desired or required, the polymer is washed on this filter with water carried through the line 14 to remove ammonium salts and any excess ammonium hydroxide. The procedure is the same as that described above with reference to washing of the polymer on the device 12. The washings from the device 46 are indicated by the lines 48. From the washing device 46 the polymer crumb falls, as indicated by the line 50, onto the conveyor belt 52, from which it is discharged for use in making a spinning solution.

Instead of rotary vacuum filters hereinbefore mentioned as being suitable forms that the devices 12 and 46 may take, we may use (instead of either or both) centrifugal units capable of isolating the polymer, water-washing the isolated polymer, and discharging the washed polymer as a crumb containing about 35% to 50% by weight of water.

In order that those skilled in the art better may understand how the present invention can be carried into effect, the following examples are given by way of illustration and not by way of limitation. All parts and percentages are by weight.

EXAMPLE 1

A terpolymer is made from a monomeric mixture of 7.5% vinyl acetate, 7.5% 2-methyl-5-vinylpyridine and 85% acrylonitrile by polymerizing in an aqueous medium with an oxidation-reduction catalyst system comprised of chloric acid and sulfurous acid, and in the presence of a small amount of nitric acid. The resulting terpolymer, after stripping off the unreacted monomers and washing with water at 60° C., contains, in combined state, about 86.0% acrylonitrile, about 6.3% 2-methyl-5-vinylpyridine, about 5.4% vinyl acetate, and about 1.8% nitrate ion (calculated as $NaNO_3$) which resists washing out with water. The washed polymer is in the form of a wet polymer crumb containing about 35% to 40% water.

The above terpolymer is used in a series of polymer washings to study the effect of the base used, the quantity of base used, the temperature, and the time on the completeness of removal of nitrate from the polymer. Two hundred (200) grams of polymer, containing 1.8 grams (0.021 equivalent) of nitrate (as $NaNO_3$) per 100 grams of polymer, and 800 grams of deionized water are mixed in a 2-liter, 3-necked flask equipped with a graduated burette, stirrer, thermometer and condenser. The flask is placed in a constant-temperature bath and permitted to remain at the desired temperature with agitation for 0.5 hour prior to addition of base. The desired quantity of base is added from the burette. The residence time is considered to start at the time of addition of the base to the slurry. When pH measurements are desired, a flask equipped with two side probes permits the introduction of the required electrodes. At the end of the desired time, all or a portion of the polymer is collected by filtering on a Büchner funnel and is then washed with 8 cc. of deionized water per gram of polymer.

Varied quantities of NaOH are added and samples are withdrawn at varied time intervals at 30° C. in order to determine the nitrate level in the polymer. Results are given in Table I.

Table I

| Milliequivalents of NaOH/100 g. of polymer | Nitrate Concentration (as $NaNO_3$) at Varied Time Intervals | | | | | |
|---|---|---|---|---|---|---|
| | Time in Minutes | | | | | |
| | 1 | 5 | 10 | 20 | 40 | 60 |
| (A) 17 | 1.24 | 1.14 | 1.24 | 1.05 | 1.01 | 0.92 |
| (B) 22 | 1.24 | 1.12 | 1.01 | 1.01 | 0.98 | 0.90 |

Since the polymer contains 1.8% (21 milli-equivalents) of nitrate (as $NaNO_3$) Example A is conducted with less than and Example B with more than stoichiometric amounts of NaOH. However, there is little difference in the efficiency with which the nitrate is removed. At the end of one hour approximately 50% of the nitrate has been removed.

The effect of temperature upon the removal of nitrate ions with NaOH is studied at pH of 8.0 and 9.0 and at 40° C. and 50° C. Higher temperatures and pH are not examined because of excessive yellowing of the polymer. These data are found in Table II.

*Table II*

| pH Maintained | Milliequivalents of NaOH required per 100 g. of polymer | Temp., °C. | Residence Time (Minutes) | Percent Nitrate (as NaNO₃) |
|---|---|---|---|---|
| 8.0 | 14.0 | 40 | 60 | 0.95 |
| 8.0 | 16.7 | 50 | 60 | 0.76 |
| 9.0 | 15.3 | 40 | 60 | 0.94 |
| 9.0 | 17.0 | 50 | 60 | 0.66 |

By comparing the data of Tables I and II it will be noted that the efficiency of NaOH is aided very little by increasing the temperature of the treatment. Since less than stoichiometric equivalent amounts of NaOH are needed to maintain a pH as high as 9.0, it is obvious that NaOH is very inefficient in its reaction with nitrate anions. When less than stoichiometric equivalent amounts of NH₄OH are used at 30° C., the results are similar to those found with NaOH. Data are given in Table III.

*Table III*

| Milliequivalents of NH₄OH per 100 g. of polymer | Nitrate Concentration (as NaNO₃) at Varied Time Intervals | | | | | |
|---|---|---|---|---|---|---|
| | Time in Minutes | | | | | |
| | 1 | 5 | 10 | 20 | 40 | 60 |
| 18.1 | 1.10 | 1.07 | 0.94 | 1.03 | 1.03 | 0.92 |

However, the efficiency of NH₄OH is greatly improved by use of higher temperatures, as shown in Table IV.

*Table IV*

| pH Maintained | Milliequivalents of NH₄OH Required per 100 g. of polymer | Temp., °C. | Residence Time (Minutes) | Percent Nitrate (as NaNO₃) |
|---|---|---|---|---|
| 8.0 | 36.0 | 40 | 60 | 0.29 |
| 8.0 | 40.5 | 50 | 60 | 0.21 |
| 9.0 | 71.0 | 40 | 60 | 0.24 |
| 9.0 | 88.5 | 50 | 60 | 0.18 |
| 7.0 | 27.5 | 40 | 60 | 0.40 |
| 7.0 | 30.0 | 50 | 60 | 0.29 |

By comparing the data of Tables II and IV it will be noted that the efficiency of NH₄OH is aided greatly by increasing the temperature of the treatment. The nitrate removal is increased, thereby consuming ammonia and causing an increase in the number of milliequivalents required to maintain a given pH. It is also probable that loss of ammonia at high temperature and pH also results in increased ammonia requirements.

The greater demand for base to maintain a given pH when NH₄OH is used at 40–50° C. than when NaOH is used, and the greater efficiency of NH₄OH in removing anions (nitrate), may be noted by comparing Tables II and IV.

EXAMPLE 2

Polymer prepared in the manner described in Example 1 is treated continuously using the equipment described in accompanying FIGURE 1. Example A is treated with water at 60° C. on the washing device, e.g., a rotary vacuum filter 12, prior to treating with ammonia at 55° C. and pH 6.8 for 3 hours in tanks 38, 40, and 42. The polymer is collected on a suitable washing device, 46, e.g., a centrifuge, and washed with water at 30° C. Example B is treated with water at 30° C. on the filter prior to treating with ammonia at 30° C. and pH 10.0 for 9 hours. This polymer is collected in the same manner as in Example A. Example C is treated with water at 60° C. on the filter prior to treating with ammonia at 30° C. and pH 10.0 for 9 hours. This polymer is also collected in the same manner as in Example A. The data are found in Table V.

*Table V*

| Example | Filter Wash Temp., °C. | Ammonia Treatment Conditions | | | Polymer Slurry, pH | Percent Acetone Soluble Polymer | Percent Nitrate as NaNO₃ | Polymer Solution, APHA Color | Fiber Yellowness |
|---|---|---|---|---|---|---|---|---|---|
| | | pH | Temp., °C. | Residence Time | | | | | |
| A | 60 | 6.8 | 55 | 3 | 7.6 | 0.88 | 0.19 | 85 | 0.126 |
| B | 30 | 10.0 | 30 | 9 | 8.1 | 1.61 | 0.40 | 105 | 0.173 |
| C | 60 | 10.0 | 30 | 9 | 8.0 | 0.90 | 0.42 | 100 | 0.180 |

Note 1.—Polymer color is determined by measuring the APHA color value of a solution of 5.0 g. of polymer in 100 cc. of dimethylformamide. The APHA is a recognized standard for comparing liquids of yellow color.
Note 2.—Fiber yellowness is obtained from the following calculations: The difference between the percent reflectance at 650 millimicrons wave length and at 430 millimicrons is divided by the percent reflectance at 550 millimicrons. The quotient of this value and 1.57 is equal to fiber yellowness.

The amount of ammonia remaining on the polymer crumb is indicated by preparing a mixture of one part polymer in four parts of water at 60° C. After one minute of agitation the pH of this mixture is determined. High pH indicates much ammonia remains adsorbed on the polymer crumb. Low pH is a result of acid anions not previously removed. An esentially neutral polymer should result in a pH near 7.0.

The polymers described in the examples are converted to fibers following the general procedure described in, for instance, U.S. Patents Nos. 2,558,730, –731, and –733. A spinning solution comprised of ten parts of polymer, 45 parts of sodium thiocyanate, and 45 parts of water is extruded at a temperature of 95° C. through a 45-hole spinnerette at such a rate that 0.584 gram of polymer is extruded per minute. The maximum rate at which the gelled fiber can be collected without causing a break is considered to be the "maximum pullaway." Under standard conditions the fiber in gel state is collected at 10 meters/minute, washed free of solvent, and stretched during its pasage through a hot water bath by passing it about a roll having a peripheral speed of 82.3 meters/minute. The stretched fiber is then dried and heated in relaxed state as described in the aforementioned patents, after which it is wound onto a bobbin at the rate of 70 meters per minute. The final denier of the fiber is 1.67/filament.

A small fraction of each of the polymers described above is found to be soluble in acetone. When polymer is converted into fiber as described above it is found that the presence of this acetone-soluble fraction causes the coagulating bath to foam. Therefore, reduction of the percent polymer soluble in acetone is important if it is desired to spin fiber continuously without interference by foam.

By comparison of Examples A and C in Table V it can be seen that use of high temperature-low pH conditions for treating polymer with ammonia results not only in lower residual nitrate levels in shorter time but also results in polymer of improved color. The yellowness of the final fiber is reduced by use of the conditions outlined in Example A.

The polymer-slurry pH values of Example A indicate that the amount of ammonia remaining is less than that of Examples B and C. Since the nitrate values of Examples B and C are higher than that of Example A and the presence of nitrate would tend to lower the pH, the difference in the amount of ammonia adsorbed is probably even greater than that indicated by the pH values in Table V.

Polymer B contains a larger acetone-soluble fraction than either that of A or C. Washing the polymer with water at 60° C. rather than 30° C. prior to treatment with ammonia tends to reduce the amount of polymer that can be dissolved in acetone. When spun into fiber polymer B tends to create more foam in the coagulating bath than does either polymer A or C.

It is observed when conducting the treatment under the conditions of Example A that the amount of ammonia used for each one hundred pounds of polymer treated is about one-tenth the amount of ammonia used in Examples B and C.

EXAMPLE 3

The effect of the temperature of the water wash prior to the ammonia wash is shown in Table VI. Each sample is treated with ammonia at 30° C. and pH 10 after having been washed with deionized water at 30° C. or 60° C. The time of the treatment with ammonia is varied from one to nine hours.

*Table VI*

| Example | Temp. of Initial Wash, ° C. | Time of Ammonia Treatment (Hours) | Percent Acetone-Soluble Polymer |
|---|---|---|---|
| A | 30 | 1 | 1.13 |
| B | 30 | 4 | 1.11 |
| C | 30 | 9 | 1.00 |
| D | 60 | 1 | 0.53 |
| E | 60 | 4 | 0.46 |
| F | 60 | 9 | 0.70 |

From the data in Table VI it can be seen that use of water at 60° C. prior to treating with ammonia reduces the percent polymer that is soluble in acetone to an average of 0.56%, and when the polymer is washed with water at 30° C. the percent polymer that is soluble in acetone is approximately 1.08%.

EXAMPLE 4

The polymer prepared as shown in Example 1 is washed water at 60° C. on a rotary-type filter. This salt-form polymer is then treated with ammonia at the varied conditions outlined in Table VII and is then washed with water at 60° C. after the polymer is collected on a centrifuge. The data are found in Table VII.

From the data in Table VII it will be seen that, when the treatment with ammonia is conducted at 60° C., the removal of nitrate anions is almost as efficient at pH 5.0 as when the treatment is conducted at pH 10.2 and 30° C. In the latter case so much ammonia remains adsorbed on the polymer crumb that the slurry pH is 8.6 despite the high level of nitrate remaining. The slurry pH's found for Examples E and F are very low, since the nitrate content is relatively high and very little ammonia remains adsorbed on the polymer. Use of low pH, high-temperature conditions consumes about one-seventh as much ammonia as does the use of pH 10.2 at 30° C. during the ammonia treatment.

EXAMPLE 5

Polymer is prepared using the techniques outlined in Example 1, but varying the monomer-feed composition. In each case at least 80% acrylonitrile is used in the feed. A different basic monomer, 2-vinyl pyridine or 4-vinyl pyridine, is used to replace 2-methyl-5-vinylpyridine. Methyl acrylate or methyl methacrylate is used to replace vinyl acetate. In each example the salt-form polymer is washed with 8 parts of deionized water at 60° C. per part of polymer prior to treatment with ammonia. One-half of the polymer is treated with ammonia at pH 10 and 30° C. for 0.5 hour, and one-half at pH 6.5 and 55° C. for 0.5 hour. Each polymer is then washed with 8 parts of water at 60° C. per part of polymer. Data are found in Table VIII.

*Table VIII*

| Example | Monomer Feed Composition [1] | Percent Nitrate as NaNO$_3$ | |
|---|---|---|---|
| | | Treated at pH 10 and 30° C. | Treated at pH 6.5 and 55° C. |
| A | 85% AN—7.5% MA—7.5% MVP | 0.37 | 0.17 |
| B | 90% AN—5% VA—5% 4-VP | 0.26 | 0.11 |
| C | 90% AN—5% MA—5% 4-VP | 0.29 | 0.10 |
| D | 85% AN—10% VA—5% 2-VP | 0.24 | 0.16 |
| E | 85% AN—10% MA—5% 2-VP | 0.31 | 0.18 |
| F | 90% AN—5% MMA—5% MVP | 0.25 | 0.13 |

[1] 4-VP is 4-vinylpyridine; 2—VP is 2-vinylpyridine; MVP is 2-methyl-5-vinylpyridine; MA is methyl acrylate; MMA is methyl methacrylate; AN is acrylonitrile; VA is vinylacetate.

EXAMPLE 6

The effects of the ammonia wash conditions (pH, time and temperature) on residual nitrate content and fiber yellowness are studied by means of a factorially designed set of experiments. Each polymer is washed with deionized water at 60° C. both before and after the treatment with ammonia. The pH, temperature and time conditions of the treatment are found in Table IX along with the percent nitrate (as NaNO$_3$) and the fiber yellowness results.

*Table VII*

| Example | Ammonia Treatment Conditions | | | Volume Concentrated Ammonia Required per 100 grams of Salt-form Polymer, cc. | Final Polymer Slurry, pH | Solution APHA | Percent Nitrate as NaNO$_3$ |
|---|---|---|---|---|---|---|---|
| | pH | Temp., | Time in min. | | | | |
| A | 10.2 | 30 | 60 | 15 | 8.6 | 95 | 0.33 |
| B | 7.0 | 60 | 60 | 3.2 | 7.8 | 80 | 0.06 |
| C | 6.5 | 60 | 60 | 2.2 | 7.7 | 70 | 0.11 |
| D | 6.0 | 60 | 60 | 2.1 | 7.6 | 65 | 0.19 |
| E | 5.5 | 60 | 60 | 2.0 | 6.1 | 65 | 0.32 |
| F | 5.0 | 60 | 60 | 1.9 | 4.2 | 70 | 0.37 |

Table IX

| Example | Ammonia Treatment Conditions | | | Percent Nitrate as NaNO₃ | Fiber Yellowness |
|---|---|---|---|---|---|
| | pH | Temp., °C. | Time (Hours) | | |
| A | 6.0 | 60 | 1½ | 0.18 | 0.146 |
| B | 5.7 | 55 | 2 | 0.26 | 0.119 |
| C | 6.5 | 46.8 | 2 | 0.28 | 0.128 |
| D | 6.5 | 55 | 2 | 0.17 | 0.125 |
| E | 7.0 | 60 | 3 | 0.05 | 0.155 |
| F | 6.0 | 50 | 1½ | 0.32 | 0.118 |
| G | 6.5 | 55 | 2 | 0.13 | 0.135 |
| H | 6.5 | 55 | 2 | 0.16 | 0.121 |
| I | 6.0 | 60 | 2 | 0.14 | 0.141 |
| J | 6.5 | 55 | 3.9 | 0.13 | 0.132 |
| K | 6.5 | 55 | 1 | 0.18 | 0.131 |
| L | 6.5 | 55 | 2 | 0.16 | 0.120 |
| M | 7.0 | 60 | 1½ | 0.15 | 0.139 |
| N | 7.0 | 50 | 3 | 0.13 | 0.129 |
| O | 6.5 | 55 | 2 | 0.16 | 0.123 |
| P | 7.3 | 55 | 2 | 0.05 | 0.147 |
| Q | 6.0 | 50 | 3 | 0.27 | 0.111 |
| R | 6.5 | 63.2 | 2 | 0.06 | 0.164 |
| S | 7.0 | 50 | 1½ | 0.16 | 0.148 |
| T | 6.5 | 55 | 2 | 0.14 | 0.123 |

The nitrate concentration and fiber yellowness responses fit the following equations:

(1)

Percent nitrate
$$= 0.1524 - 0.0572 X_1 - 0.0226 X_2 - 0.0540 X_3$$
$$+ 0.0039 X_1^2 + 0.0039 X_2^2 + 0.0096 X_3^2$$
$$- 0.0050 X_1 X_2 + 0.0225 X_1 X_3 - 0.0075 X_2 X_3$$

(2)

Fiber yellowness $= 0.1262 + 0.0076 X_1 + 0.0100 X_3$
$$+ 0.0025 X_1^2 + 0.0074 X_3^2 - 0.0051 X_1 X_3$$

where $$X_1 = 2 \text{ (pH} - 6.5), \quad X_2 = \frac{\text{Log time} - .30103}{0.175} \text{ and}$$

$$X_3 = \frac{\text{Temperature} - 55}{5}$$

It may be seen from Equation 2 that under the conditions used in this study fiber color is independent of the length of time of the ammonia treatment. All of the fiber yellowness values obtained are superior to those obtained from polymer which had been treated with ammonia at pH 10 and 30° C. (Examples 2–B and 2–C).

Figure 2:
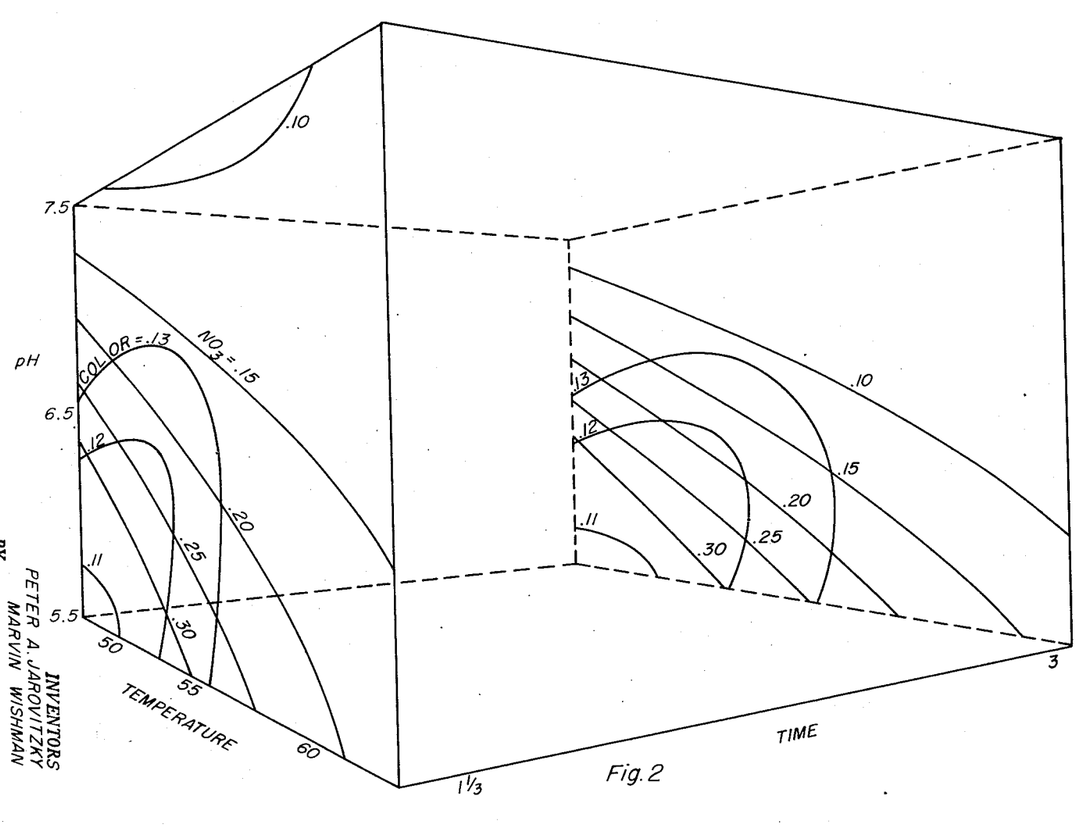

Fiber yellowness increases as the pH and temperature of the treatment with ammonia increase. Residual nitrate levels decrease as the treatment temperature, pH and time increase. Since those factors leading to low residual nitrate levels cause increased fiber yellowness, the operating conditions must be carefully selected. Equations 1 and 2, supra, are shown in graph form in the accompanying FIG. 2. Optimum operating conditions to obtain a desired nitrate level with a minimum of color degradation can be selected by reference to the graphs of FIG. 2.

It will be understood, of course, by those skilled in the art that our invention is not limited to the treatment of the particular copolymers of monomers comprising acrylonitrile and a vinylpyridine (or acrylonitrile, a vinylpyridine and a third, different, monoethylenically unsaturated material) shown by way of illustration in the foregoing examples. Thus, instead of the particular vinylpyridines employed in the individual example, one can use any other vinylpyridine such as those mentioned in this specification for illustrative purposes prior to the examples; and, more particularly, vinylpyridines of the kind embraced by Formulas, I, II, III and IV. Also, instead of the third, different, monoethylenically unsaturated material used in the individual example, one can employ any other such material or materials such, for instance, as one, two, three or any desired number of any of those recited for purposes of illustration in the portion of this specification prior to the examples.

It is also to be understood that, instead of the particular temperature and pH conditions specified in the individual examples, other temperature and pH conditions within the ranges recited in the broad description of the invention are operative. However, optimum results are obtained within the more limited temperature and pH ranges that are specified.

We claim:

1. In the production of a filament-forming polymer comprised of, by weight, a major amount of acrylonitrile and a minor amount of a vinylpyrdine combined in the polymer molecule, the improvement which comprises contacting, at 40° C. to 80° C., an undissolved, inorganic acid salt form of the said polymer with a liquid treating agent maintained at a pH ranging between 5.0 and 7.5 by the addition of aqueous ammonia solution and in which the said polymer is insoluble, thereby to reduce substantially the amount of inorganic acid that is present as a salt in the said polymer.

2. The improvement as in claim 1 wherein the liquid treating agent has a pH ranging between about 6.0 and about 7.0.

3. The improvement as in claim 1 wherein the vinylpyridine combined in the polymer molecule is a methyl vinylpyridine.

4. In the production of a filament-forming polymer comprised of, by weight, a major amount of acrylonitrile and a minor amount of a vinylpyridine combined in the polymer molecule, the improvement which comprises mixing together an undissolved nitric acid salt form of the said polymer and an aqueous solution of ammonia, the resulting slurry being at a temperature between 40° C. and 80° C. and having a pH ranging between 5.0 and 7.5, thereby to reduce substantially the amount of nitric acid that is present as a salt in the said polymer; and washing the resulting polymer with approximately neutral water.

5. The improvement as in claim 4 wherein the polymer of acrylonitrile is a filament-forming copolymer of, by weight, at least 80% acrylonitrile and at least 2% of a methyl vinylpyridine including 2-methyl-5-vinylpyridine.

6. The improvement as in claim 4 wherein the slurry is at a temperature between about 45° C. and about 75° C. and has a pH ranging between about 6.0 and about 7.0.

7. In the production of a filament-forming polymer comprised of, by weight, a major amount of acrylonitrile and a minor amount of a vinylpyridine combined in the polymer molecule, the improvement which comprises washing with water, at a temperature between about 10° C. and about 80° C., an undissolved, inorganic acid salt form of said polymer; contacting, at 40° C. to 80° C., the washed, salt form of the said polymer with an aqueous liquid treating agent in which the said polymer is insoluble and which is maintained at a pH ranging between 5.0 and 7.5 by the addition of aqueous ammonia solution, thereby to reduce substantially the amount of inorganic acid that is present as a salt in the said polymer; and washing the resulting polymer with an approximately neutral fluid comprising water.

8. In the production of a filament-forming copolymer of, by weight, from 80% to 96% acrylonitrile, from 2% to 10% of a vinylpyridine including 2-methyl-5-vinylpyridine and from 2% to 10% of a third different monoethylenically unsaturated material, the improvement which comprises forming a slurry of a solid inorganic acid salt form of the said polymer and an aqueous solution of ammonia, said slurry being at a temperature between about 50° and about 70° C. and having a pH ranging between about 6 and about 7; agitating the said slurry for a period sufficient to reduce substantially the amount of inorganic acid that is present as a salt in the said polymer; isolating the thusly treated polymer from the said slurry; and washing the isolated polymer with approximately neutral water at a temperature between about 10° C. and about 80° C.

9. The improvement as in claim 8 wherein the copolymer is a copolymer of, by weight, from 80% to 96% acrylonitrile, from 2% to 10% of 2-methyl-5-vinylpyridine and from 2% to 10% of vinyl acetate and is in the form of a nitric acid salt thereof.

References Cited in the file of this patent

UNITED STATES PATENTS

| | | |
|---|---|---|
| 2,564,726 | Saner | Aug. 21, 1951 |
| 2,936,211 | Kocay et al. | May 10, 1960 |

UNITED STATES PATENT OFFICE
CERTIFICATE OF CORRECTION

Patent No. 3,120,504                       February 4, 1964

Peter A. Jarovitzky et al.

It is hereby certified that error appears in the above numbered patent requiring correction and that the said Letters Patent should read as corrected below.

Column 2, line 57, for "arises" read -- arise --; column 3, line 26, for "organic" read -- inorganic --; column 5, line 28, for "acrylontrile" read -- acrylonitrile --; column 6, line 6, for "vinylpyiridine" read -- vinylpyridine --; line 71, for "acids" read -- acid --; column 9, line 67, for "II" read -- III --; column 10, line 58, for "pasage" read -- passage --; column 13, line 65, after "particular" insert -- vinylpyridine or --.

Signed and sealed this 30th day of June 1964.

(SEAL)
Attest:

ERNEST W. SWIDER
Attesting Officer

EDWARD J. BRENNER
Commissioner of Patents